United States Patent [19]

Holcomb, Jr.

[11] 3,995,723
[45] Dec. 7, 1976

[54] DEFORMABLE RIGID SEAL FOR A HYDRAULIC BRAKE APPARATUS

[75] Inventor: Orla L. Holcomb, Jr., South Bend, Ind.

[73] Assignee: Clark Equipment Company, Buchanan, Mich.

[22] Filed: Aug. 13, 1975

[21] Appl. No.: 604,276

[52] U.S. Cl. .............................. 188/72.4; 92/98 D; 92/103 M; 188/71.8; 188/196 R; 188/370
[51] Int. Cl.² ...................................... F16D 55/18
[58] Field of Search .............. 188/71.8, 72.4, 72.5, 188/196 R, 370; 92/98 D, 101, 102, 103 M

[56] References Cited

UNITED STATES PATENTS

| 1,085,818 | 2/1914 | Oxhard | 92/98 D |
|---|---|---|---|
| 2,106,791 | 2/1938 | Brisson | 92/101 |
| 2,241,056 | 5/1941 | Chilton | 92/103 M |
| 2,839,086 | 6/1958 | Engelberger | 92/103 M |
| 2,942,624 | 6/1960 | Good | 92/98 D |
| 3,126,879 | 3/1964 | Canfield | 92/98 D |
| 3,376,959 | 4/1968 | Holcomb et al. | 188/71.8 |
| 3,403,754 | 10/1968 | Barrett et al. | 188/71.8 |
| 3,675,743 | 7/1972 | Thompson | 188/72.5 |
| 3,851,567 | 12/1974 | Thompson | 188/71.8 |
| 3,899,057 | 8/1975 | Carre | 188/71.8 |

FOREIGN PATENTS OR APPLICATIONS

| 1,255,063 | 1/1961 | France | 92/98 D |
|---|---|---|---|
| 1,196,309 | 11/1959 | France | 188/370 |
| 1,204,033 | 9/1970 | United Kingdom | 188/71.8 |

Primary Examiner—Trygve M. Blix
Assistant Examiner—Edward R. Kazenske
Attorney, Agent, or Firm—Ernst H. Ruf

[57] ABSTRACT

A rigid and deformable hydraulic seal for a force-applying mechanism, the seal being interposed between a piston and a housing cavity. This seal is generally cup-shaped and has an annular outer end portion that is rigidly retained in a peripheral groove of the housing cavity. Adjacent to this end portion is a half torus or single convolution hoop portion open toward the cavity, with the seal further including a generally cylindrical side surface and a circular bottom portion, with this seal, together with the cavity, defining a fluid-tight variable volume chamber. Fluid pressure supplied to this chamber causes plastic deformation of the seal and permits relative motion to occur between the piston and housing. When used in a hydraulic brake apparatus, the plastic deformation of the seal provides automatic brake adjustment as a factor of lining material wear, whereas the elastic deformation which occurs as the fluid pressure in the chamber is reduced provides a slight retraction capability of the friction lining from the rotating brake member.

3 Claims, 1 Drawing Figure

U.S. Patent   Dec. 7, 1976   3,995,723
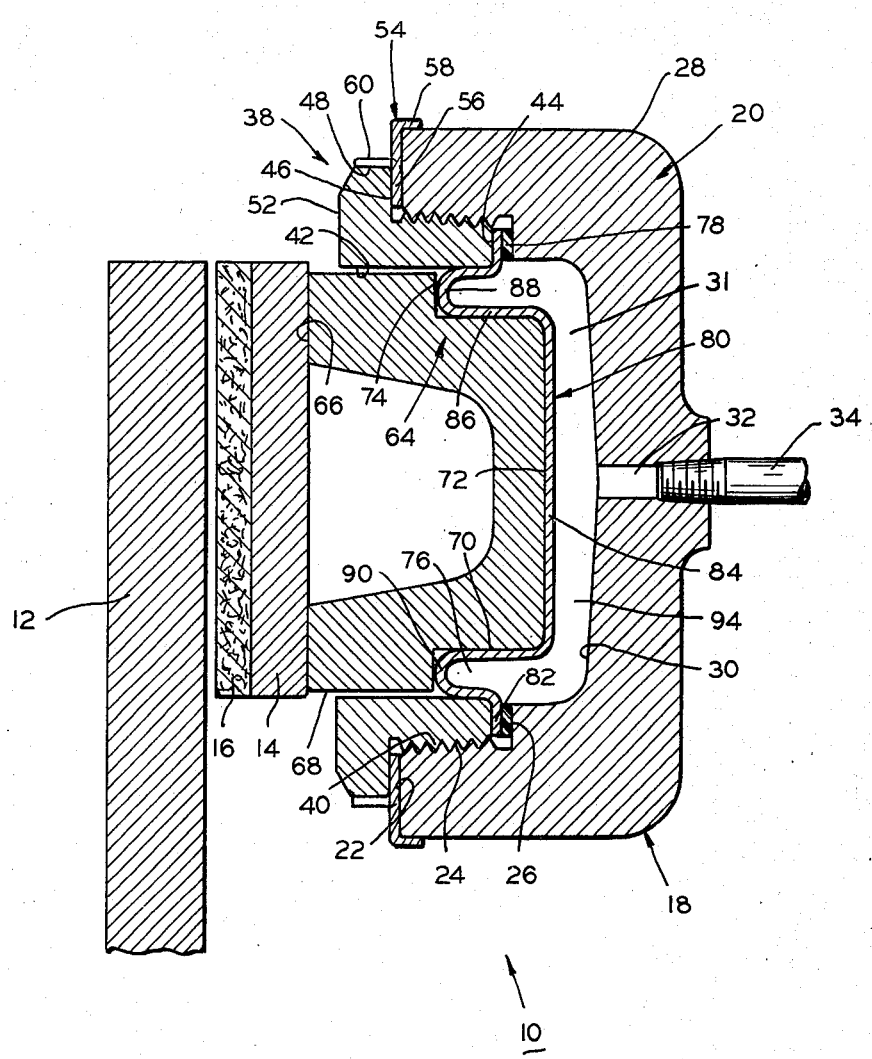

DEFORMABLE RIGID SEAL FOR A HYDRAULIC BRAKE APPARATUS

BACKGROUND OF THE INVENTION

1. Field Of The Invention

The field of art to which this invention pertains is that of force applying mechanisms, and more specifically, to a rigid and deformable hydraulic seal particularly adaptable for use in hydraulic brake systems.

2. Description Of The Prior Art

The prior art is replete with automatic brake adjusting and reset devices that progressively advance the retracted position of the piston to compensate for brake wear. Examples of prior art include the inventor's own prior U.S. Pat. No. 3,376,959 which discloses the use of a typical fluid motor utilizing a piston and a rubbing O-ring type seal in addition to a separate automatic brake adjuster mechanism. U.S. Pat. No. 3,403,754 to Barrett et al. again shows the use of a piston rubbing against an elastomeric seal contained in the cylinder housing. Separate bellows-type return and adjustment means are also utilized. While these prior art devices appear to perform satisfactorily in the brake environment for which they were designed, they appear to be structurally complex, costly to manufacture and sometimes difficult to service.

U.S. Pat. No. 3,851,567 to Thompson discloses a brake mechanism that includes an actuator having a pair of spaced end portions, an endless side wall extending between the end portions and at least one inelastically deformable corrugation formed in the side wall that tends to flatten out inelastically when the actuator is forced to extend and thus increase the space between the end portions. However, this thin-walled bellows-like member also utilizes a substantially rigid internal reinforcing member and a layer of elastomeric material in addition to a resilient packing ring. This structure is both structurally and functionally complex.

SUMMARY OF THE INVENTION

The deformable and rigid hydraulic seal of this invention solves many of the previously-noted problems of complexity, cost and serviceability in that it utilizes a rather simple generally cup-shaped member made of plastically deformable rigid yet malleable material, with this hydraulic seal member being interposed between a piston and a housing cavity in which the piston is slidably received. The cup-shaped seal member includes a generally circular bottom portion adjoining the inner end surface of the piston; a generally cylindrical side surface adjoining a peripheral surface of the piston; a half torus hoop portion open toward the housing cavity; and a generally annular outer end portion that radially extends into a peripheral groove in the housing and is fixedly secured thereto in a fluid-tight relationship. The seal member, together with the housing cavity, defines a fluid-tight variable volume chamber whereby the application of fluid pressure into the chamber causes plastic deformation of the seal and permits relative motion to occur between the piston and the housing.

The piston has a stepped portion to permit the insertion of the seal half torus hoop portion which operates on an "inside-out" principle, with the major axis of the hoop portion being parallel to the direction of movement of the piston. The seal member is preferably made of a malleable metal having a large specific elongation value, such as annealed aluminum or stainless steel, and the plastic deformation of the seal provides automatic brake adjustment as a factor of lining material wear. Furthermore, since the seal also deforms elastically according to Hook's Law, as the fluid pressure in the variable volume chamber is reduced, this elastic deformation of the seal permits the slight retraction of the piston and thereby provides a desired slight clearance between the brake friction lining and the rotating brake member.

In order to facilitate manufacturing and assembly, the cylinder housing may include an annular retaining nut whose central bore forms a portion of the housing cavity. The retaining nut and an optional elastomeric washer, interposed between the cylinder housing and the annular outer end portion of the seal member, produce a fluid-tight seal with respect to the variable volume chamber.

This unique seal member requires no rubbing contact areas, has high temperature tolerance and is insensitive to lack of hydraulic brake fluid lubricity. Other features and advantages of the invention will become more readily understood by persons skilled in the art when following the detailed description in conjunction with the drawing.

BRIEF DESCRIPTION OF THE DRAWING

The single drawing FIGURE is a fragmentary axial sectional view taken through a force-applying mechanism, such as a disc brake, incorporating this invention.

DESCRIPTION OF THE PREFERRED EMBODIMENT

Referring to the single drawing FIGURE, it will be seen that numeral 10 designates a brake of the disc type of construction, with this type of construction merely being a representation of a common brake mechanism and it should be understood that the deformable hydraulic seal of this invention may be used on all types of brakes having piston-cylinder actuating means.

Brake 10 consists of one or more discs, rotors or rotating members 12 that are generally adapted to be attached to and rotated by a member that is to be braked, such as an axle shaft, hub or wheel (none of which are shown).

A pressure plate, backing member or shoe 14 has friction lining 16 fixedly secured thereto, with member 14 being suitably supported for axial movement relative to disc 12.

The force imposed on pressure plate 14, tending to axially displace it toward and into engagement with an annular side surface of disc 12, is derived from one or more fluid motors or piston and cylinder assemblies 18 secured on a rotatably fixed brake carrier member (not shown) that is in turn affixed to a structure such as a machine or a vehicle having a rotating member that is to be braked.

Piston and cylinder assembly 18, which functions as an actuating means for axially displacing friction lining 16, includes a generally cup-shaped member or cylinder 20 that has an annular end surface 22 which merges, at its inner end, into an internal and axially extending threaded portion 24. The inner end of thread portion 24 merges into an intermediate annular surface 26 that is parallel to and concentric with the annular end surface 22. The inner end of annular surface 26 merges into a generally cup or U-shaped (in cross-section) end surface or portion 30 that defines a cavity 31, with portion 30 being provided with a port 32 that is connected, via a conduit 34, to receive fluid from a conventional operator-controlled pressure source (not shown).

Operatively cooperating with cylinder thread portion 24 is threaded portion 40 of an annular retaining nut or member 38 also having a central bore portion 42 and an inner annular end face 44 whose outer end merges into threaded portion 40 and whose inner end merges into cylindrical bore portion 42. Retaining nut 38 is further provided with intermediate annular surface 46, peripheral outer surface 48, and annular outer end surface 52. Interposed between retaining nut intermediate annular surface 46 and cylinder annular end surface 22 is an annular portion 56 of a locking member 54 which further includes step portions 58 and 60 that are in contact with cylinder peripheral outer surface 28 and retaining nut peripheral outer surface 48, respectively. It is the function of locking member 54 to prevent rotational movement between cylinder 20 and retaining nut 38.

Slidingly received within retaining nut cylindrical bore portion 42 and extending into cup-shaped end surface 30 of cylinder 20 is a piston 64 whose outer annular end surface 66 is in constant contact with one side of backing member 14. Piston 64 includes a large or outer diameter portion 68, which is slidably received within retaining nut bore portion 42, and a small or inner diameter portion 70 which on one end smoothly merges into cylindrical end surface 72 and whose other end merges into annular connecting surface 74.

Interposed between retaining nut inner annular end surface 44 and cylinder intermediate annular surface 26 is the annular outer end portion 82 of a rigid and deformable hydraulic seal member 80. Optionally, an annular elastomeric or soft metal washer and seal 78 can be interposed between intermediate annular surface 26 and seal member portion 82 to accommodate surface irregularities and facilitate sealing. Seal member 80, which is generally cup shaped and includes a generally circular bottom portion 84 that merges into generally cylindrical side portion 86, further includes a half torus or single convolution hoop portion 88, the inner end of which merges into side portion 86 and the outer end of which merges into outer end portion 82. As best shown in the drawing, seal member bottom portion 80 abuts piston cylindrical end surface 72 while seal member side portion 86 is in contact with piston small diameter portion 70. Seal member hoop portion 88, which is generally of an inverted U-shape in cross section, occupies annular space 76 between piston small diameter portion 70 and retaining nut cylindrical bore portion 42.

Deformable hydraulic seal member 80 together with cup shaped cylinder end surface 30 defines a variable volume chamber 94 which is fluidically connected, via port 32 and conduit 34 to a conventional operator-controlled pressure source, such as for example a foot pedal operated brake master cylinder (not shown).

Seal member 80, which requires no rubbing contact areas, functions to prevent the loss of fluid pressure containment within cavity or chamber 94, while at the same time permitting relative motion between piston 64 and cylinder 20. It should be understood that if annular surface 26 has a smooth finish and is substantially flat, it can directly contact seal member outer end portion 82 and form a fluid-tight seal therewith, thereby obviating the need for washer and seal 78.

In operation, seal member 80 is plastically deformed by the fluid pressure within chamber 94 and relative motion occurs between piston 64 and cylinder 20. Since half-torus hoop portion 88 is open toward chamber 94, it operates on an inside-out principle and the major axis of portion 88 is parallel to the direction of movement of piston 64. The seal material must be ductile or malleable and have sufficient elongation properties so as to deform or yield plastically without rupturing. Materials usable for this purpose include metals such as type 1100 aluminum and fully annealed type 300 stainless steel having, for example, a uniform 0.03125 inch wall thickness. A typical nominal hoop elongation may be defined as follows:

$$\text{Nominal hoop elongation} = \frac{\pi D_o - \pi D_i}{\pi D_i}$$

$$= \frac{D_o - D_i}{D_i} = \frac{2.75 - 2.25}{2.25}$$

$$= \frac{0.5}{2.25} = 22.3\%$$

Where:
$D_o$ = Outside diameter of the hoop portion.
$D_i$ = Inside diameter of the hoop portion.

It should be understood that apex 90 of hoop portion 88, which can also be designated as the roll point of the hoop, moves forward only 50% of the piston stroke distance because of the very nature of the half-torus hoop construction, i.e., its inverted loop or U-structure.

It should also be understood that seal member 80, which operates in an inside-out manner, is not related to a bellows concept in that the material yields rather than being deflected as is the case in bellows or diaphragm operation. The plastic deformation of deformable hydraulic seal 80 also permits the seal to act as an automatic brake or slack adjuster in the sense that, as friction lining 16 wears, hoop 88 will be automatically displaced toward rotating member 12. The rigid nature of seal 80 keeps piston 64 from excessive retraction when the fluid pressure in variable volume chamber 94 is reduced.

However, at the same time, the elastic deformation of seal member 80 provides for some piston retraction capacity in that as the fluid pressure in cavity 94 is reduced, the elastic property of the rigid seal member provides for a slight retraction of hoop portion 88 thus permitting a minimum brake clearance.

From the previous discussion it should be readily apparent that rigid and deformable hydraulic seal member 80 possesses the following advantages:

1. It requires no rubbing contact areas.
2. It deforms plastically as relative motion occurs between the piston and cylinder.
3. The plastic deformation provides automatic brake adjustment as a factor of lining wear.
4. The seal deforms elastically as the fluid pressure is reduced in the cylinder-piston cavity.
5. The elastic deformation provides a slight retraction required for minimum brake clearance.
6. In addition to positive sealing, this seal eliminates close fit requirements.
7. It also has high temperature tolerance.

It should also be readily apparent that the use of the rigid and deformable hydraulic seal member of this invention is not restrictive to piston and cylinder assemblies for use with hydraulic brakes, but could be utilized in numerous force-applying mechanisms.

From the foregoing, it is believed that those familiar with the art will readily recognize and appreciate the novel concepts and features of the present invention. Obviously, while the invention has been described in relation to only a single embodiment, numerous variations, changes and substitutions of equivalents will present themselves to persons skilled in the art and may be made without necessarily departing from the scope and principles of this invention. As a result, the embodiment described herein is subject to various modifications, changes and the like, without departing from the scope and spirit of the invention, with the scope thereof being determined solely by reference to the claims appended hereto.

What is claimed is:

1. Hydraulic brake apparatus comprising in combination:
   a. a cylinder housing having a cavity formed therein with a closed end and an open end, said cavity being generally U-shaped in a cross-section of said housing;
   b. a port in said closed end connected with a source of fluid pressure;
   c. an annular retaining member fixedly secured to said housing and having a central bore that forms a portion of said housing cavity, with an inner annular end surface of said retaining member forming a portion of a peripheral groove in said housing;
   d. a generally cup-shaped stepped piston member slidably received within said cavity and having a reduced diameter stepped cylindrical portion, with an inner circular end surface of the latter opposing said cavity closed end;
   e. a rotating member to be braked;
   f. a friction material member interposed between said rotating member and an outer end surface of said piston; and
   g. a rigid and deformable, impervious metal seal member interposed between said piston stepped portion and said cavity closed end and defining a fluid-tight variable volume chamber therewith, said seal member being generally cup-shaped and including:
      i. a circular bottom portion adjoining the inner end surface of said piston member reduced diameter stepped cylindrical portion;
      ii. a generally cylindrical side surface adjacent to said piston stepped cylindrical portion, with one end of said seal member side surface merging into said circular bottom portion;
      iii. a generally annular outer end portion radially extending into said peripheral groove and fixedly secured therein, in fluid-tight relationship, by said annular retaining member;
      iv. a half torus hoop portion, open toward said cavity, with an inner end of said hoop portion merging into the other end of said seal member side surface, an outer end of said hoop portion merging into said seal member outer end portion, whereby fluid pressure applied to said variable volume chamber causes plastic deformation of said seal member thereby displacing said piston and consequently said friction material member into engagement with said rotating member, whereas reduction of said fluid pressure in said variable volume chamber causes elastic deformation of said seal member which in turn permits a slight retraction of said friction material member from said rotating member.

2. The hydraulic brake apparatus of claim 1 wherein said seal member is made of type 1100 aluminum.

3. The hydraulic brake apparatus of claim 1 wherein said seal member is made of fully annealed type 300 stainless steel.

* * * * *